(12) United States Patent
Petri et al.

(10) Patent No.: US 11,391,602 B2
(45) Date of Patent: Jul. 19, 2022

(54) OPERATIONS USING A PERIODIC ROTATION ANGLE SENSOR SIGNAL

(71) Applicant: Infineon Technologies AG, Neubiberg (DE)

(72) Inventors: Alessandro Petri, Villach (AT); Simone Fontanesi, Villach (AT); Filippo Grillotti, Villach (AT); Andrea Possemato, Villach (AT); Massimiliano Zilli, Villach (AT)

(73) Assignee: Infineon Technologies AG

( * ) Notice: Subject to any disclaimer, the term of this patent is extended or adjusted under 35 U.S.C. 154(b) by 0 days.

(21) Appl. No.: 17/030,812

(22) Filed: Sep. 24, 2020

(65) Prior Publication Data
US 2021/0096002 A1    Apr. 1, 2021

(30) Foreign Application Priority Data

Sep. 26, 2019 (DE) .......................... 102019214757.7

(51) Int. Cl.
*G01D 5/244* (2006.01)
*G01D 5/248* (2006.01)

(52) U.S. Cl.
CPC ......... *G01D 5/24476* (2013.01); *G01D 5/248* (2013.01)

(58) Field of Classification Search
CPC ............... G01D 5/24476; G01D 5/248; G01D 5/2451; G01D 5/249; G01P 3/481; G01P 3/487; G01P 3/488
See application file for complete search history.

(56) References Cited

U.S. PATENT DOCUMENTS

| 8,450,996 B2 * | 5/2013 | Foletto ................. G01D 5/2448 324/174 |
| 2005/0225318 A1 | 10/2005 | Bailey et al. |
| 2011/0298447 A1 | 12/2011 | Foletto et al. |
| 2014/0288883 A1 | 9/2014 | Hammerschmidt et al. |
| 2016/0123770 A1 * | 5/2016 | Feucht .................... G01D 5/145 324/207.2 |
| 2018/0335441 A1 * | 11/2018 | Hammerschmidt .... G01P 3/488 |
| 2020/0309569 A1 * | 10/2020 | Ehrich ..................... G01D 5/24 |
| 2020/0378802 A1 * | 12/2020 | Yashan ................... G01P 3/481 |

FOREIGN PATENT DOCUMENTS

| CN | 105371874 A | 3/2016 |
| CN | 110196014 A | 9/2019 |
| CN | 107639978 B | 11/2019 |
| EP | 2749888 A2 | 7/2014 |

\* cited by examiner

*Primary Examiner* — Christopher P McAndrew
*Assistant Examiner* — Zannatul Ferdous
(74) *Attorney, Agent, or Firm* — Design IP

(57) ABSTRACT

A periodic sensor signal representing a varying rotation angle detected by a rotation angle sensor is compared to a number of thresholds to detect threshold crossings of the periodic sensor signal. An output signal including a pulse pattern at the time of a threshold crossing may be generated only if the direction of rotation has not changed since an immediately preceding threshold crossing. A number of consecutive threshold crossings which take place without a change in the direction of rotation may be counted and an update of the offset register is performed only if the number of consecutive threshold crossings which take place without a change in the direction of rotation is equal to or higher less than the number of thresholds.

25 Claims, 12 Drawing Sheets

OPERATIONS USING A PERIODIC ROTATION ANGLE SENSOR SIGNAL

FIELD

The present disclosure relates to operations performed using a periodic sensor signal representing a varying rotation angle detected by a rotation angle sensor and, to be more specific, to the generation of an output signal based on such a periodic signal and/or to the determination whether an update of an offset register of a rotation angle sensor is to be performed.

BACKGROUND

Generally, rotation angle sensors may be used to detect a rotation angle of an object. For example, a magnetic field sensor may be used to detect a varying magnetic field generated by a rotating object. The rotating object may be a magnetic field source, such as a pole wheel, or may be a toothed wheel of a ferromagnetic material, which is arranged relative to a magnet in order to influence the magnetic field generated by the magnet. The output of the magnetic field sensor may be a periodic sensor signal indicating the rotation of the rotating object. The rotating object may be attached to a wheel of a vehicle so that the rotation of the wheel may be detected and so that the output of the magnetic field sensor may be indicative for the wheel speed. Such rotation angle sensors may be regarded as representing wheel speed sensors.

Rotation angle sensors may generate output signals according to different signal protocols. In a so-called AK protocol, at each zero crossing of a periodic sensor signal a pulse pattern is generated. In a so-called high-resolution AK protocol, a pulse pattern is generated each time the periodic sensor signal passes one of a number of thresholds. The pulse pattern may include a first pulse of a larger amplitude and a number of information bits representing pulses of a lower amplitude. Ina so called PWM protocol (PWM=pulse width modulation), pulses of different widths may be generated each time the periodic sensor signal passes one or more thresholds. Independent of the protocol used, the pulse pattern may include information on the direction of the detected rotation.

SUMMARY

It would be desirable to make rotation angle sensors more robust with respect to vibrations.

Examples of the present disclosure provide an apparatus for generating an output signal based on a periodic sensor signal representing a varying rotation angle detected by a rotation angle sensor, the apparatus being configured to:

compare the periodic sensor signal to a number of thresholds to detect threshold crossings of the periodic sensor signal;

generate the output signal including a pulse pattern at the time of a threshold crossing if the direction of rotation has not changed since an immediately preceding threshold crossing; and generate the output signal not including a pulse pattern at the time of the threshold crossing if the direction of rotation has changed since the immediately preceding threshold crossing.

Examples of the present disclosure provide an apparatus for determining whether an update of an offset register of a rotation angle sensor is to be performed, the apparatus being configured to:

compare a periodic sensor signal of the rotation angle sensor to a number of thresholds to detect threshold crossings of the periodic sensor signal;

count a number of consecutive threshold crossings which take place without a change in the direction of rotation;

decide that an update of the offset register is not to be performed if the number of consecutive threshold crossings which take place without a change in the direction of rotation is less than the number of thresholds; and decide that an update of the offset register is to be performed if the number of consecutive threshold crossings which take place without a change in the direction of rotation is equal to or higher than the number of thresholds.

Examples of the present disclosure permit the output signal of a rotation angle sensor to be robust against vibrations of an amplitude lower than a specific amplitude. To be more specific, in examples pulse patterns, so-called protocols, in the output signals are prevented if a rotation does not cause the periodic signal to pass more than one threshold in the same direction. In examples, offset correction of the rotation angle sensor may be made robust against vibrations by performing an update of an offset register only if a number of consecutive threshold crossings which take place without a change in the direction of rotation is equal to or higher than the number of thresholds to which the periodic signal is compared. In other words, an update of the offset register is not performed if there was not a movement of a full magnetic period in one direction.

BRIEF DESCRIPTION OF THE DRAWINGS

Examples of the disclosure will be described using the accompanying drawings, in which:

FIG. 5b shows an example of another periodic sensor signal calculated using the periodic sensor signal shown in FIG. 5a;

DETAILED DESCRIPTION

In the following, examples of the present disclosure will be described in detail using the accompanying drawings. It is to be pointed out that the same elements or elements that have the same functionality are provided with the same or similar reference numbers, and that a repeated description of elements provided with the same or similar reference numbers is typically omitted. Hence, descriptions provided for elements having the same or similar reference numbers are mutually exchangeable. In the following description, a plurality of details is set forth to provide a more thorough explanation of examples of the disclosure. However, it will be apparent to one skilled it the art that other examples may be practiced without these specific details. In other instances, well-known structures and devices are shown in block diagram form rather than in detail in order to avoid obscuring examples described herein. In addition, features of the different examples described herein may be combined with each other, unless specifically noted otherwise.

Figure 1:
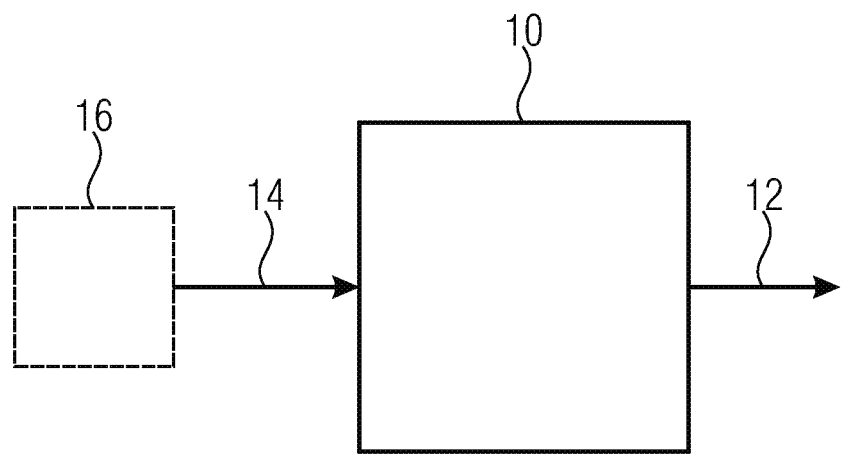
FIG. 1 shows a schematic diagram of an example of an apparatus for generating an output signal according to the present disclosure.

FIG. 1 shows an example of an apparatus 10 for generating an output signal 12 based on a periodic sensor signal 14 according the present disclosure. The periodic sensor signal 14 represents a varying rotation angle detected by a rotation angle sensor 16, such as a magnetic rotation angle sensor. Rotation angle sensor 16 is shown in broken lines as it needs not be part of the apparatus. Apparatus 10 compares the periodic sensor signal 14 to a number of thresholds to detect threshold crossings of the periodic sensor signal 14. Apparatus 10 generates a pulse pattern in the output signal 14 at the time of a threshold crossing if the direction of rotation has not changed since an immediately preceding threshold crossing. Apparatus 10 does not generate a pulse pattern in the output signal at the time of a threshold crossing if the direction of rotation has changed since an immediately preceding threshold crossing. The term immediately preceding threshold crossing means the threshold crossing which is closest in time to the threshold crossing concerned and took place before the threshold crossing concerned. Apparatus 10 may output the output signal 12 to an external device such as an electronic control unit, ECU.

Figure 2:
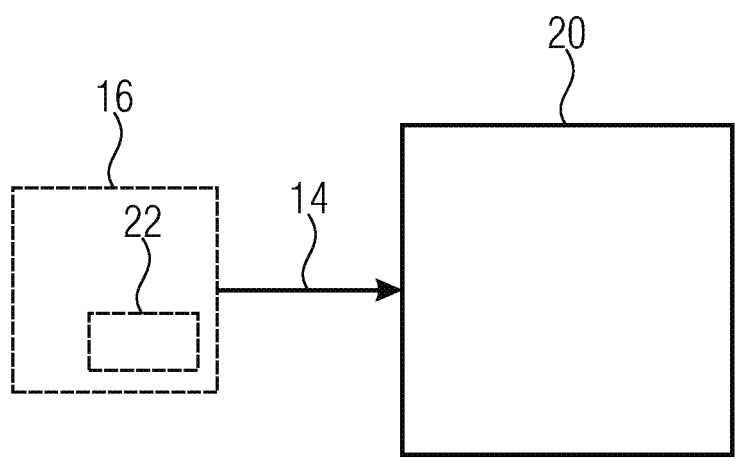
FIG. 2 shows a schematic diagram of an example of an apparatus for determining whether an update of an offset register is to be performed.

FIG. 2 shows an example of an apparatus 20 for determining whether an update of an offset register 22 of a rotation angle sensor 16 is to be performed. Apparatus 10 compares periodic sensor signal 14 of rotation angle sensor 16 to a number of thresholds to detect threshold crossings of the periodic sensor signal and to count a number of consecutive threshold crossings which take place without a change in the direction of rotation. Apparatus 20 decides that an update of offset register 22 is not to be performed if the number of consecutive threshold crossings which take place without a change in the direction of rotation is less than the number of thresholds. Apparatus 20 decides that an update of the offset register 22 is to be performed if the number of consecutive threshold crossings which take place without a change in the direction of rotation is equal to or higher than the number of thresholds.

In examples, the functionalities of apparatus 10 and apparatus 20 may be combined in a single apparatus.

Figure 3:
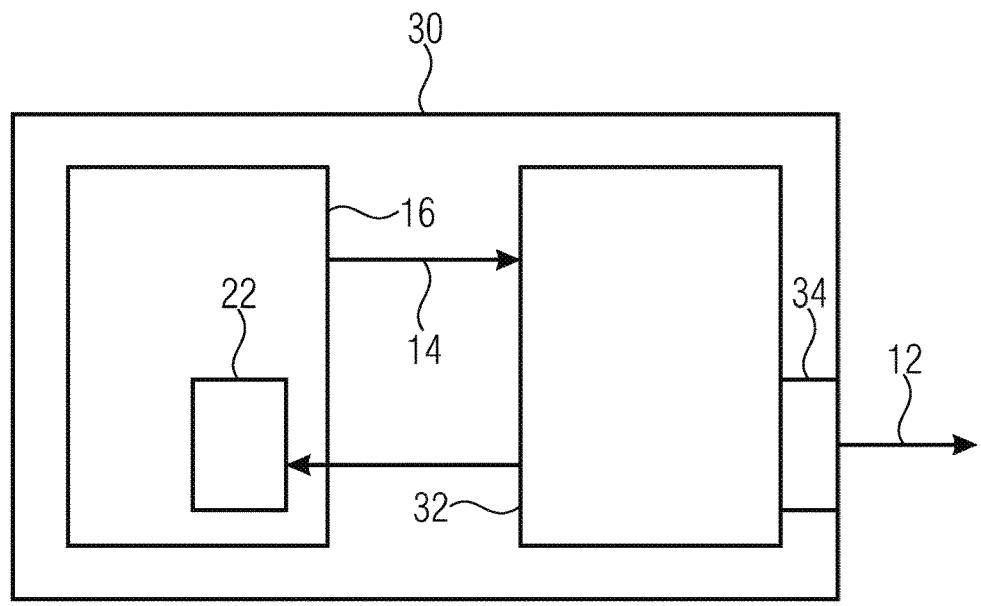
FIG. 3 shows a schematic diagram of an example of a rotation angle sensor device.

FIG. 3 shows an example of a rotation angle sensor device 30 according to the present disclosure. The rotation angle sensor device 30 comprises a rotation angle sensor 16, such as a magnetic sensor, which is configured to provide the periodic sensor signal 14. The rotation angle sensor 16 may include offset register 22. Rotation angle sensor device 30 includes a processing unit 32, which may implement the functionality of apparatus 10, the functionality of apparatus 20, or the functionality of both apparatuses 10 and 20. Processing unit 32 may receive periodic sensor signal 14 and may output signal 12 via an interface 34. Interface 34 may be coupled to an ECU. Processing unit 32 may further be configured to update offset register 22 if it decides that an update is to be performed and not to update in the offset register if it decides that an update is not to be performed.

Interface 34 may any suitable interface, such as an interface configured for a wired communication or an interface configured for a wireless communication.

Figure 4:
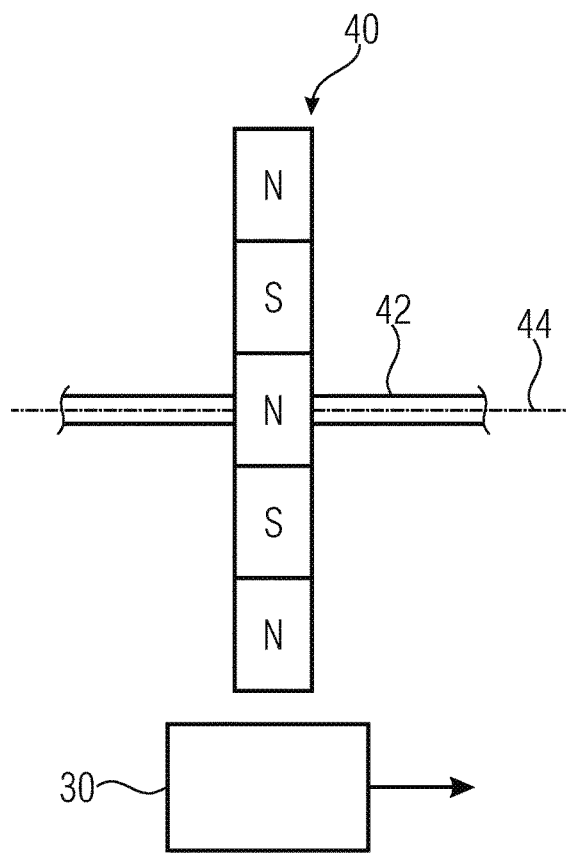
FIG. 4 shows a schematic diagram of an example of a rotation angle sensor device acting as a wheel speed sensor.

FIG. 4 shows an example of a wheel speed sensor. The wheel speed sensor comprises a rotation angle sensor device, such as the rotation angle sensor device 30 explained above with respect to FIG. 3. The wheel speed sensor additionally comprises a magnetic encoder 40. Magnetic encoder 40 may comprise a pole wheel comprising a number of pairs of north poles and south poles as indicated in FIG. 4. In other examples, the magnetic encoder may include a toothed wheel of a ferromagnetic material arranged relative to a magnet in order to influence the magnetic field generated by the magnet. Magnetic encoder 40 may be fixed to a shaft 42 and may be rotatable around an axis 44 of shaft 42 along with shaft 42. The rotation of shaft 42 may correspond to the rotation of a wheel of a vehicle so that the rotation angle detected by rotation angle sensor 16 corresponds to or at least depends on the rotation of the wheel. Thus, the wheel speed of the wheel may be detected using rotation angle sensor 16.

Rotation angle sensor 16 is positioned relative to magnetic encoder 40 so as to generate periodic sensor signal 14 when magnetic encoder 40 rotates around axis 44. In examples, rotation angle sensor 16 is a magnetic field sensor comprising a number of magnetic sensor elements and may be configured to output a first sinusoidal sensor signal in response to the magnetic field applied by magnetic encoder 40 and a second magnetic sensor element configured to output a second sinusoidal sensor signal in response to the magnetic field applied by magnetic encoder 40. The rotation angle sensor 16 may be configured to use one of a the CORDIC algorithm, the inverse tangent function or the a tan 2 function to calculate the periodic sensor signal from the first and second sinusoidal sensor signals.

In examples, rotation angle sensor 16 may comprise one or multiple AMR sensor elements (AMR=anisotropic magnetoresistance), GMR sensor elements (GMR=giant magnetoresistance), TMR sensor elements (TMR=panel magnetoresistance) or Hall sensor elements.

In examples, rotation angle sensor 16 may include a first, a second, and a third sensor element, which are arranged side by side, wherein the third sensor element is arranged centrically between the first and second sensor elements. A first sinusoidal signal is generated based on a difference between detection signals from the first and second sensor elements, and a second sinusoidal signal is generated based on a difference between the sum of the detection signals from the first and second sensor elements and a detection signal from the third element. Such sensor elements may be arranged in moving direction one after the other so that a phase difference of 90° is generated between the first and second sinusoidal signals. In examples, one of the first and second sinusoidal signals may be used as the periodic sensor signal. In examples, the first and second sinusoidal signals are combined to achieve a saw tooth shaped signal representing the periodic sensor signal.

Figure 5A:
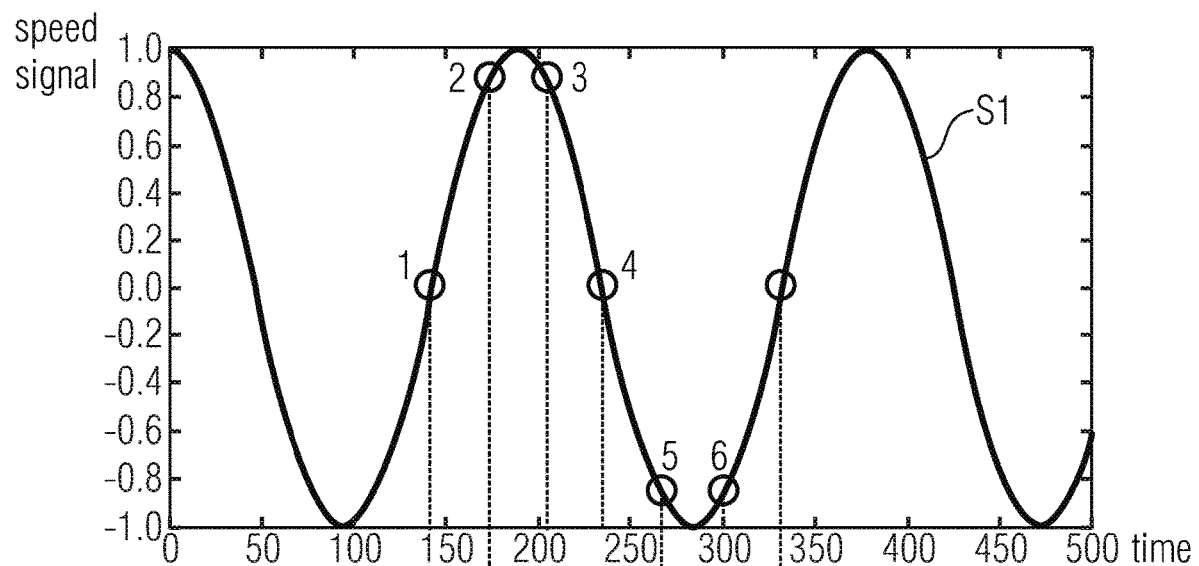
FIG. 5a shows an example of a periodic sensor signal.
Figure 5B:
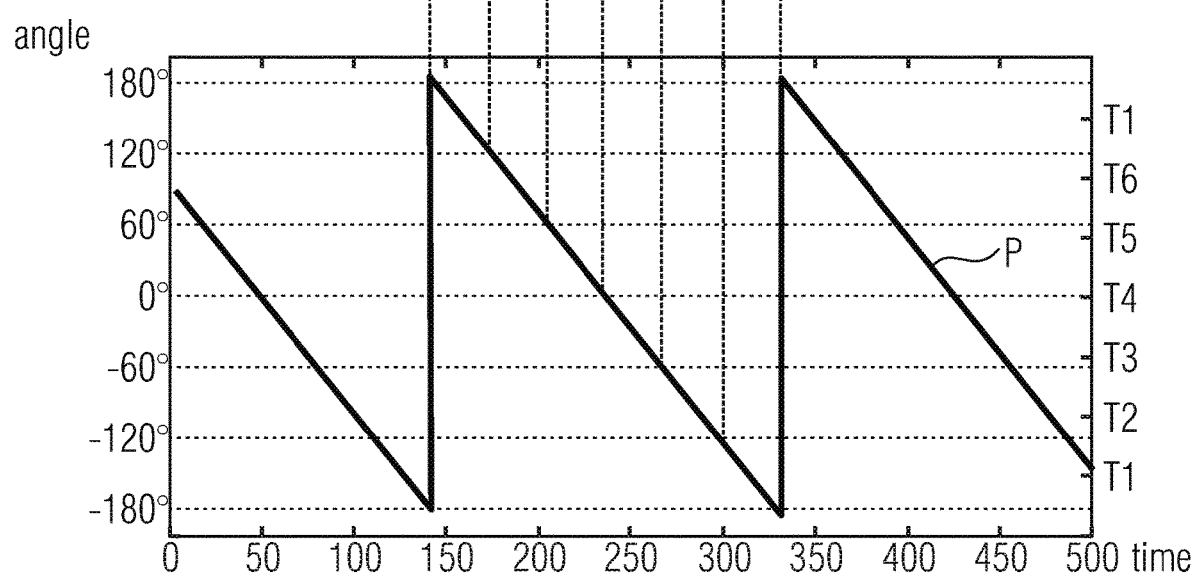

FIG. 5a) shows an example of a sinusoidal sensor signal S1, which may be one of the above first and second sinusoidal sensor signals. This signal is sometimes called speed signal. A second sinusoidal sensor signal S2, which is phase shifted by 90° with respect to sensor signal S1 is not shown in FIG. 5a). FIG. 5b) shows a periodic sensor signal P indicating a varying rotation angle cp. Angle cp representing the instantaneous phase of the magnetic signal may be calculated based on the inverse tangent function of the first and second sinusoidal sensor signals S1, S2 according to: cp=arctan(S1/S2). In examples, cp may be calculated using the CORDIC algorithm, the inverse tangent function or the a tan 2 function.

The periodic sensor signal P is compared to a number of thresholds, in the example shown in FIG. 5 six thresholds T1 to T6. Threshold T1 corresponds to an angle of ±180°, threshold T2 corresponds to an angle of 120°, threshold T3 corresponds to an angle of 60°, threshold T4 corresponds to an angle of 0°, threshold T5 corresponds to an angle of −60°, and threshold T6 corresponds to an angle of −120°. In other examples, another number of thresholds may be used, such as eight thresholds, one each 45°. By comparing periodic sensor signal P to the number of thresholds, threshold crossings are detected. The threshold crossings correspond to points 1 to 6 shown in FIG. 5a).

Figure 6:
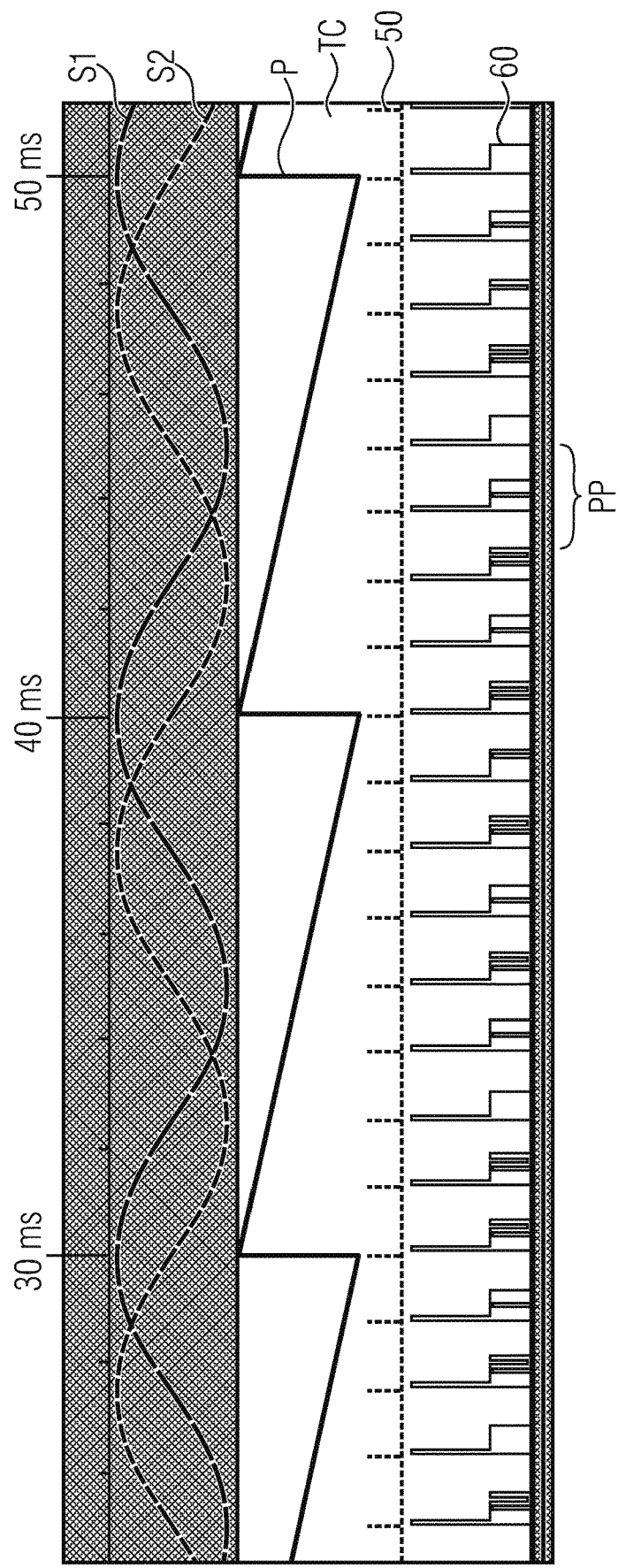
FIG. 6 shows graphs representing a first periodic sinusoidal signal, a second periodic sinusoidal signal, a periodic sensor signal, threshold crossings and an output signal including pulse patterns.

FIG. 6 shows the sinusoidal sensor signals 81 and 82 and the periodic sensor signal P calculated therefrom. In the example shown in FIG. 6, the periodic sensor signal P is compared to eight thresholds, one every 45°. A graph 50 in FIG. 6 shows threshold crossings. Each time periodic signal P crosses one of the thresholds, i.e. 45°, 90°, 135°, 180°, 225°, 270°, 315° and 360°/0°, a threshold crossing TC is indicated by a pulse in graph 50. Accordingly, a number of eight threshold crossings takes place in each magnetic period.

As shown in FIGS. 5 and 6, according to examples of the present disclosure, the number of thresholds is uniformly distributed over a full range of values of the periodic sensor signal. Moreover, in examples of the present disclosure, the number of thresholds is distributed over the full range of values of the periodic sensor signal, wherein a number of consecutive threshold crossings in the same direction, which is equal to or higher than the number of thresholds, indicates a movement over a full period of the periodic signal in one direction. In examples of the present disclosure, the number of thresholds may be 4, 6, or 8.

As indicated in FIG. 6, one pulse pattern PP or protocol may be generated in an output signal 60 at every threshold crossing TC. This represents a high resolution mode, in which pulse patterns PP are generated in the output signal when the periodic signal P crosses more than one threshold, such as six thresholds as shown in FIG. 5b) or eight thresholds as shown in FIG. 6. According to FIG. 6, eight output protocols are generated in each magnetic period. In case of a wheel speed sensor, such a high resolution mode may be used at low speed, while at high speed a low resolution mode may be used, in which a pulse pattern is generated in the output signal when the periodic sensor signal crosses a specific one of the thresholds, such as 0°, while a pulse pattern is not generated in the output signal when the periodic sensor crosses one of the other thresholds different from the specific one. The high resolution mode may be used in autonomous driving and in supporting an electric engine control loop.

As indicated in FIG. 6, each pulse pattern may comprise a first pulse having a first amplitude and a number of bits sometimes called AK bits. The bits may have a second amplitude lower than the first amplitude. The bits are encoded to provide information to a receiver of the output signal. In examples, one of the bits indicates that the sensor is in a high resolution mode and one of the bits indicates the direction of rotation. Other ones of the bits may indicate the specific threshold, which was crossed and, therefore, resulted in the generation of the pulse pattern in the output signal. Another one of the bits may indicate whether the rotation angle sensor is in a calibrated or uncalibrated mode.

The rotation angle sensor may be configured to detect the direction of rotation using the first and second sinusoidal signals. In examples, the rotation angle sensor is configured to detect the direction of rotation based on the gradient of the angle <p between two consecutive threshold crossings or based on the gradient of the angle <p between a switch-on and a first threshold crossing. Thus, examples permit a fast calculation of the direction of rotation. In other examples, the rotation angle sensor may detect the direction of rotation in a different manner.

It has been recognized that, in a high resolution mode, vibrations may result in variations in the periodic sensor signal, which may cause threshold crossings of the periodic sensor signal. Examples of the present disclosure relate to apparatuses and methods which permit output signals of a rotation angle sensor to be robust against vibrations. Examples relate to wheel speed sensing applications and, in particular, ABS (anti blocking system) wheel speed sensing applications. Examples of the present disclosure may provide correct information to an electronic control unit, ECU, independently from a vibration movement of a wheel. Examples of the present disclosure prevent delivery of wrong information and prevent lass of correct offset compensation (calibration). Examples of the present disclosure permit that a correct number of AK protocols, i.e. pulse patterns in an output signal, and correct AK bit values are produced. Examples of the present disclosure relate to a wheel speed sensor implementing the teachings according to the present disclosure.

Generally, in ABS applications, vibrations are not so common like in other speed sensing applications such as transmission or engine applications. However, there are certain cases in which the wheels may experience some small forward/backward movement, such as door slam, people entering/exiting from the car and standstill at a traffic light. For example, three cylinder engine cars may be quite sensitive to such issues due to the increased vibrations from the engine itself. Examples of the present disclosure provide approaches to cope with incorrect information and incorrect offset correction that may take place due to such vibrations.

Examples of the present disclosure are based on the idea not to switch twice on the same angle threshold, i.e. not to generate a pulse pattern in the output signal twice on the same angle threshold. To this end, a pulse pattern is generated in the output signal only if the direction of rotation has not changed since an immediately preceding threshold crossing. Thus, vibrations up to at most the angle difference between adjacent thresholds do not result in a pulse pattern in the output signal. Thus, there is a vibration suppression of plus/minus the angle difference between adjacent thresholds. In the example of eight thresholds shown in FIG. 6, there is a ±45° (magnetic degrees) vibration suppression. For Vibrations that are larger than the angle difference between adjacent thresholds, such as ±45°, pulse patterns in the output signal are not suppressed and the correct number of pulses and correct information, such as in the form of AK bits, is output in the output signal. Thus, an ECU may understand the exact wheel movement. In case of movement detection of a car, suppressing further pulse patterns (protocols) in addition to the first one after a change in the rotation direction would result in a delay in the movement detection. In applications like an autonomous parking use case such a delay should be avoided.

Thus, in examples of the present disclosure, an apparatus as disclosed herein is configured to compare the periodic sensor signal to a number of thresholds to detect threshold crossings of the periodic sensor signal, to detect whether a change of rotation direction has taken place since an immediately preceding threshold crossing, and to generate a pulse pattern at the time of the sensor crossing only if the direction of rotation has not changed since the immediately preceding threshold crossing.

A further aspect of the present disclosure is based on the idea not to update an offset register which is used for sensor calibration and/or residual offset compensation unless the angle indicated by the periodic sensor signal crosses the whole number of thresholds to which the periodic sensor signal is compared in the same direction. In the example shown in FIG. 6, eight thresholds are used and, therefore, the offset register would not be updated unless the angle crosses eight thresholds in the same direction. The fact that such a number of consecutive threshold crossings takes place means that there was a movement of a full magnetic period in one direction so that the sensor has seen the real maximum and minimum of the magnetic field. In other words, one full period of the periodic sensor signal is considered. If such a number of consecutive threshold crossings does not take place, the wheel is moving forward and backward and this is recognized as a large vibration by the sensor so that an offset update is inhibited.

Thus, in examples of the present disclosure, an apparatus as disclosed herein is configured to detect threshold crossings, to detect whether a change of the direction of rotation takes place between each two of the detected threshold crossings, to count a number of consecutive threshold crossings which take place without a change in the direction of rotation, and to perform an update of an offset register only in case the number of consecutive threshold crossings without a change of the direction of rotation indicates at least a movement of a full magnetic period. A full magnetic period means that one pair of a magnetic north pole and a magnetic south pole has passed the sensor in case of a pole wheel or a tooth and a tooth gap has passed the sensor in case of a toothed wheel.

Using the teachings of the present disclosure a sensor is capable of avoiding wrong offset updates not only at a start-up phase but also in a calibrated mode. In examples, the sensor is in a position to immediately detect a change of direction by tracking the rotation angle without waiting for a half period or a full period. Thus, in examples, the sensor is able to react immediately by inhibiting an offset/amplitude update.

In a calibrated mode, the inhibition may be performed when the history of the last number of directions is not fully consistent. The number corresponds to the number of thresholds to which the periodic sensor signal is compared. If at least one value in the history is different from the others, the history is not consistent. Thus, also in case of a single change of direction, a flag may be set and will inhibit any wrong offset update until a new period with a settled direction is detected. In order to detect whether the history is consistent, the number of threshold crossings which take place without a change in the direction of rotation is counted. If a change of direction is detected, counting of the number of threshold crossings is restarted again.

In an uncalibrated mode, at start up, the offset will not be updated if the periodic signal has not crossed the number of thresholds in the same direction. Therefore, any vibration at start up will be ignored by an offset control loop and the offset will be marked as valid only after the sensor has seen a full magnetic period, i.e. the Primary Examiner signal past the required number of thresholds with the same direction. There is no risk of a stuck-at condition since the angle is always monotonous. If a movement for a part of a period in one direction has been detected but then a vibration follows, the sensor will recognize it and will reset the counting of the detected crossed thresholds so that any update will be performed or resumed only after the condition is met.

Thus, according to examples of the present disclosure, the update of an offset register may be performed in a reliable and correct manner. Examples of the present disclosure are based on the assumption that the angle, i.e. the periodic sensor signal, is always monotonous so that the direction over one full magnetic period can be trusted. Thus, examples of the present disclosure are applied to periodic sensor signals which are monotonous over one magnetic period.

FIGS. 7 to 12 show simulation results using eight thresholds as described above referring to FIG. 6. A starting phase of vibration is 22.5°. The FIGS. show first and second simulation signals 81' and 82', which comprise periodic portions and vibration portions, the resulting sensor signal P' calculated based on 81' and 82', and the resulting output signal 12. In FIGS. 7 to 12, a respective pulse pattern in the output signal 12 comprises a first pulse having a first amplitude if the threshold of 0° is crossed and a first pulse having a second amplitude lower than the first amplitude if thresholds different from 0° are crossed. Thus, the first pulses of the pulse patterns in FIGS. 7 to 12 includes an additional information when compared to the pulse patterns in FIG. 6. FIGS. 7 to 12 additionally show a signal 70 indicating the direction of rotation and a signal 72 indicating whether a change in the direction of rotation took place.

Figure 7:
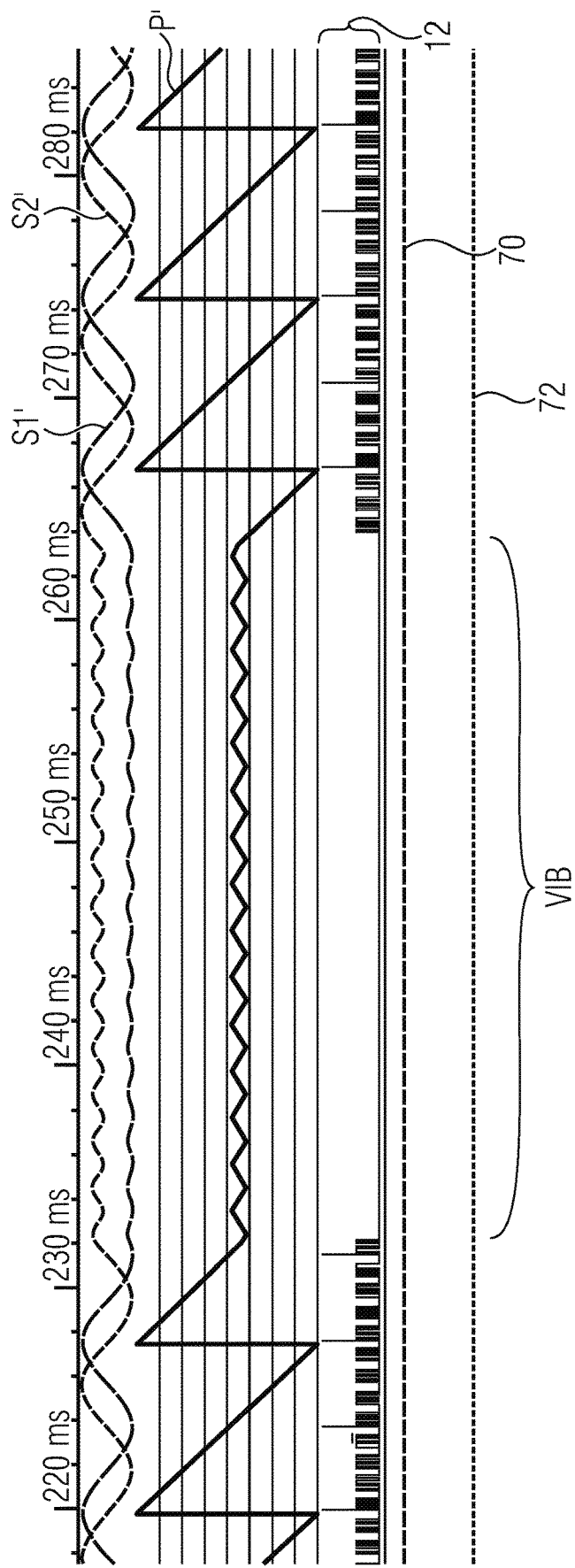
FIG. 7 to FIG. 12 show graphs representing simulation results useful in explaining examples of the present disclosure.

FIG. 7 shows the result of a simulation in the calibrated mode, wherein the vibration amplitude was 15°. As shown in FIG. 7, no pulse patterns are generated in the output signal 12 during a vibration phase VIB. The reason is that no threshold crossing takes place during the vibration phase or that a change in the direction of rotation took place between each threshold crossing in the vibration phase VIB.

Figure 8:
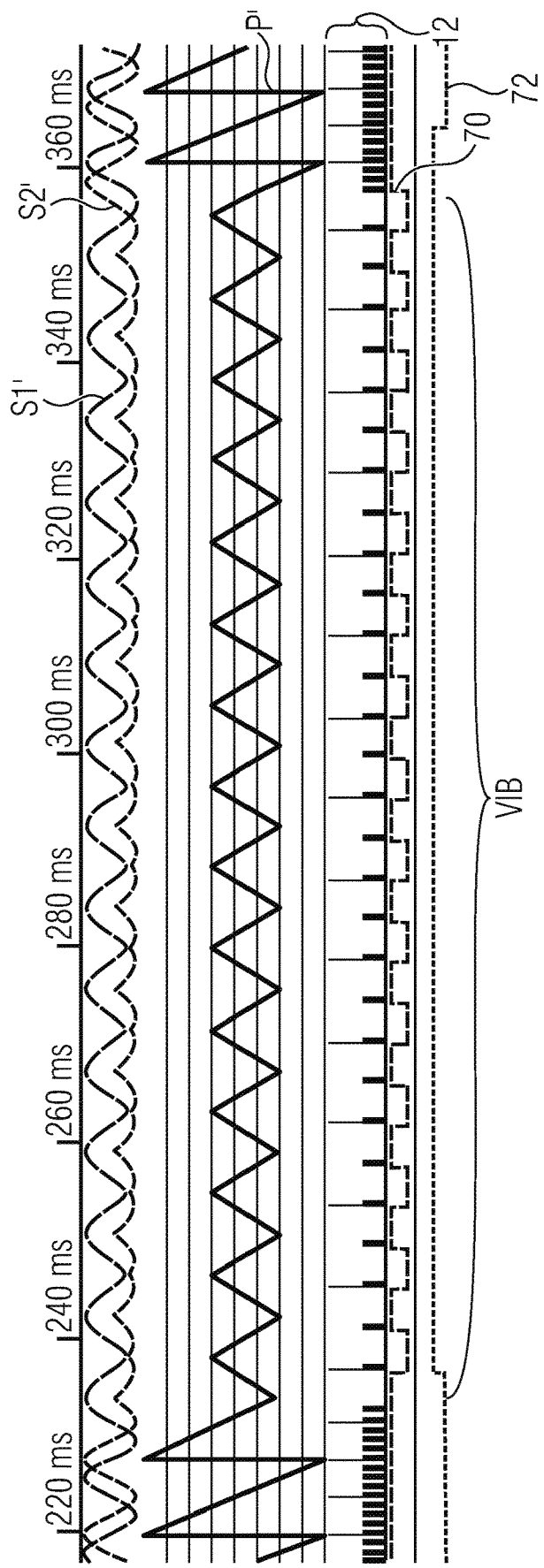
Figure 9:
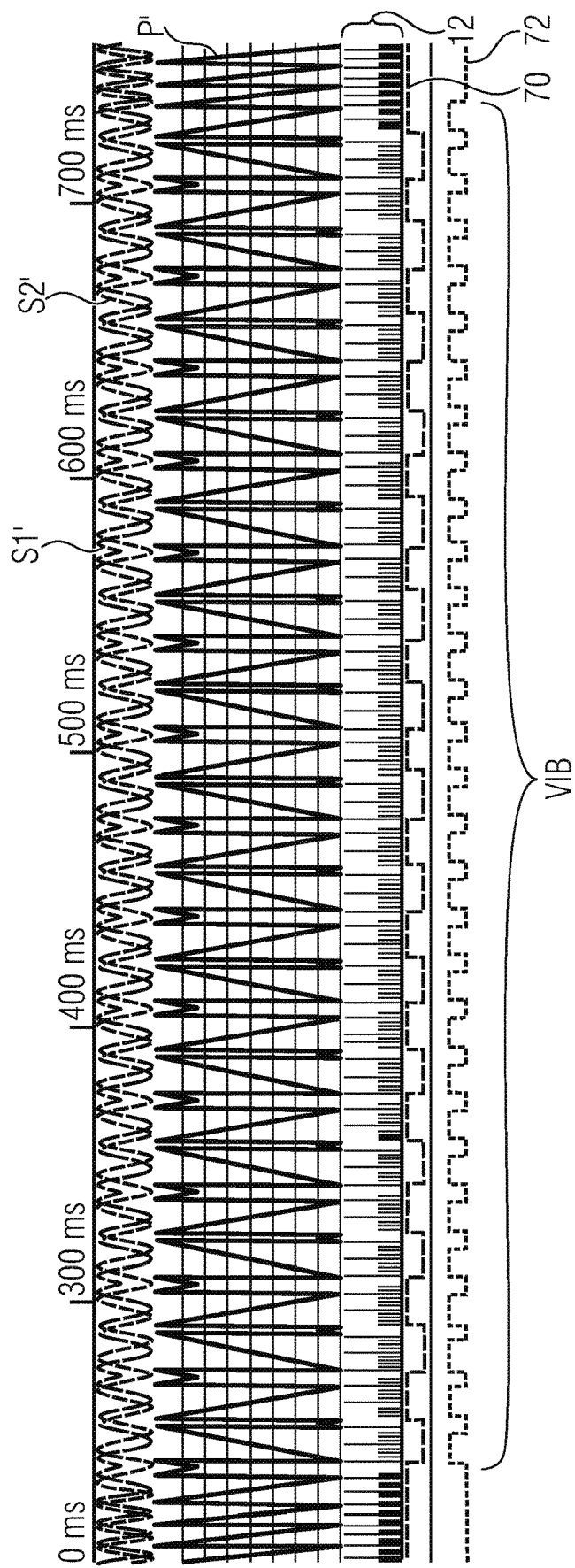

FIG. 8 shows the result of a simulation in the calibrated mode, wherein the vibration amplitude is 60°. Thus, the vibration was larger than ±45°. As it is shown in FIG. 8, pulse patterns are not generated in the output signal 12 at the time of a threshold crossing in signal P' if a change in the direction of rotation took place since a preceding threshold crossing. According to FIG. 8, this is at every 2nd threshold crossing as the vibration amplitude is 60°. Finally, FIG. 9 shows the result of a simulation in the calibrated mode, in which the vibration amplitude is 240°.

Figure 10:
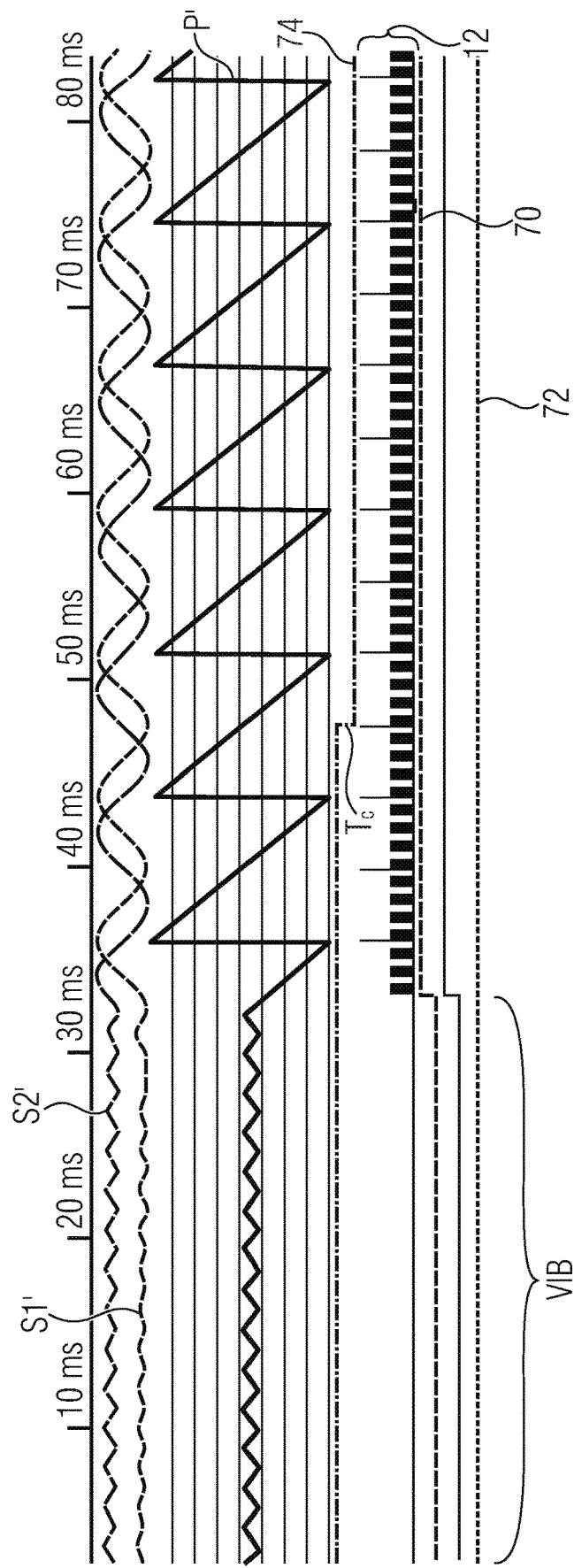
Figure 11:
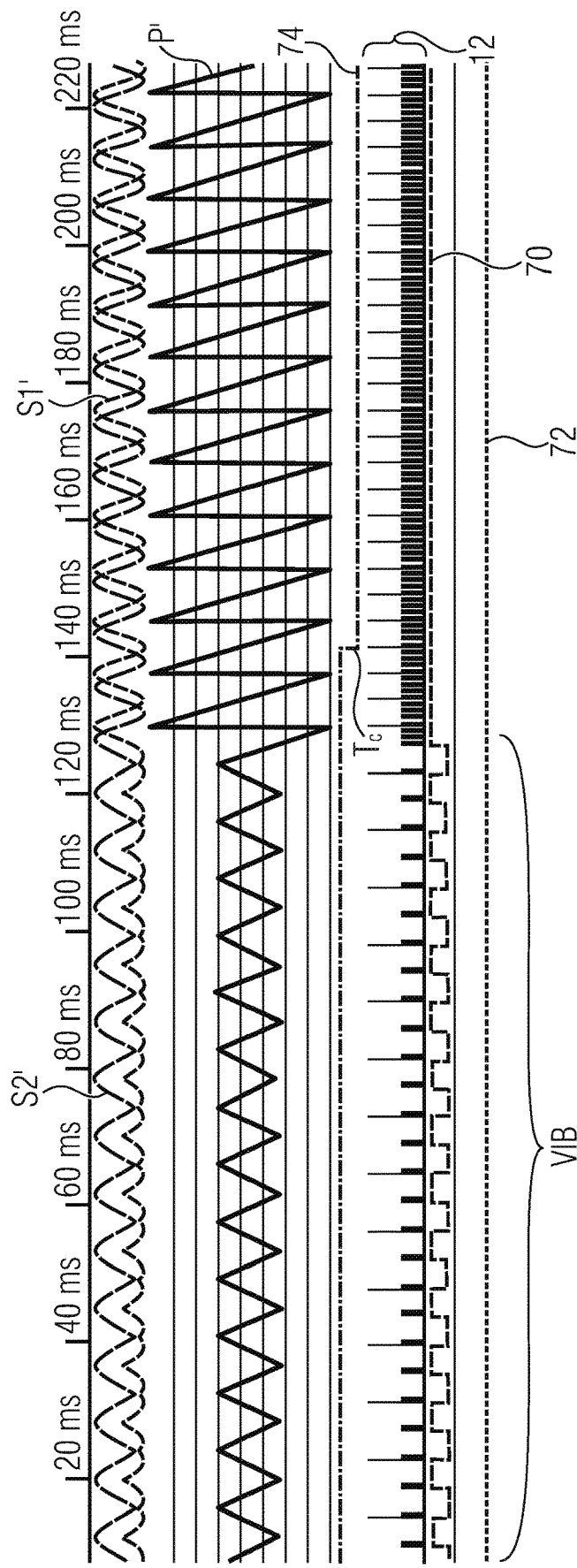
Figure 12:
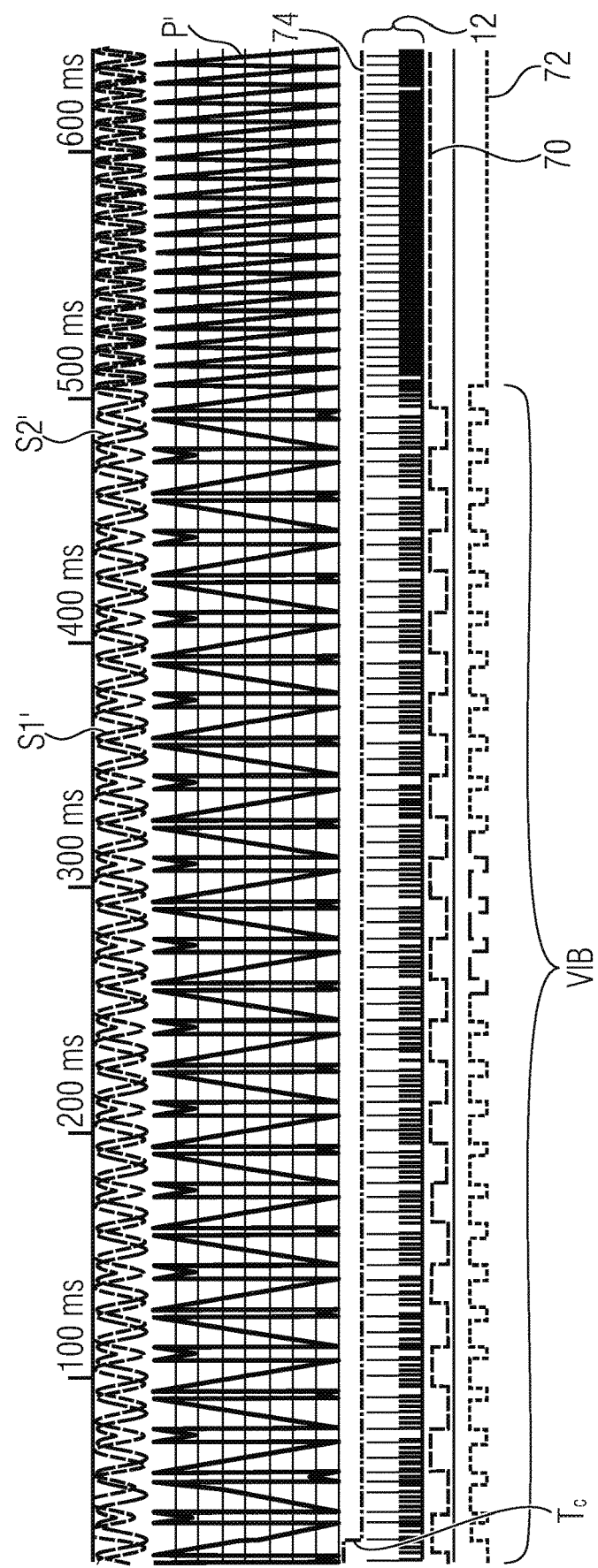

FIGS. 10 to 12 show simulation results in an uncalibrated mode. In the simulation of FIG. 10, the vibration amplitude is 15°, in the simulation of FIG. 11, the vibration amplitude is 60°, and in the simulation of FIG. 12, the vibration amplitude is 240°. In addition to the signals explained above, FIGS. 10 to 12 show a calibration signal 74 indicating whether the sensor is calibrated or not. In the example shown, a high level of signal 74 indicates that the sensor is not calibrated and a low level of signal 74 indicates that the sensor is calibrated. The time at which the sensor is calibrated is indicated in FIGS. 7 to 12 as Tc. It is clear from FIGS. 10 and 11, for example, that the calibration is finished only after signal P' indicates that a full magnetic period has passed. This is due to the fact that, according to aspects of the present disclosure, an update of the offset register is performed only if the number of consecutive threshold crossings which take place without a change in the direction of rotation is equal to or larger than the number of thresholds.

The offset register may store correction values to compensate for offsets, such as DC offsets, and/or amplitude differences of the sensor signals from which the periodic sensor signal is derived. The correction values may be determined during calibration at the start up of the sensor, i.e. while the sensor is in an uncalibrated mode. After determining the correction values, the same are written into the offset register. Thus, the offset register is initially updated and the sensor is in the calibrated mode. The correction values are than used in calculating the periodic sensor signal. Updated correction values may be determined during operation of the sensor in the calibrated mode and the offset register may be updated based on the updated correction values. Such updated correction values may be determined in a continuous or periodic manner. According to the present disclosure, the offset register is updated only in case the sensor has seen a full magnetic period as described above.

Figure 13:
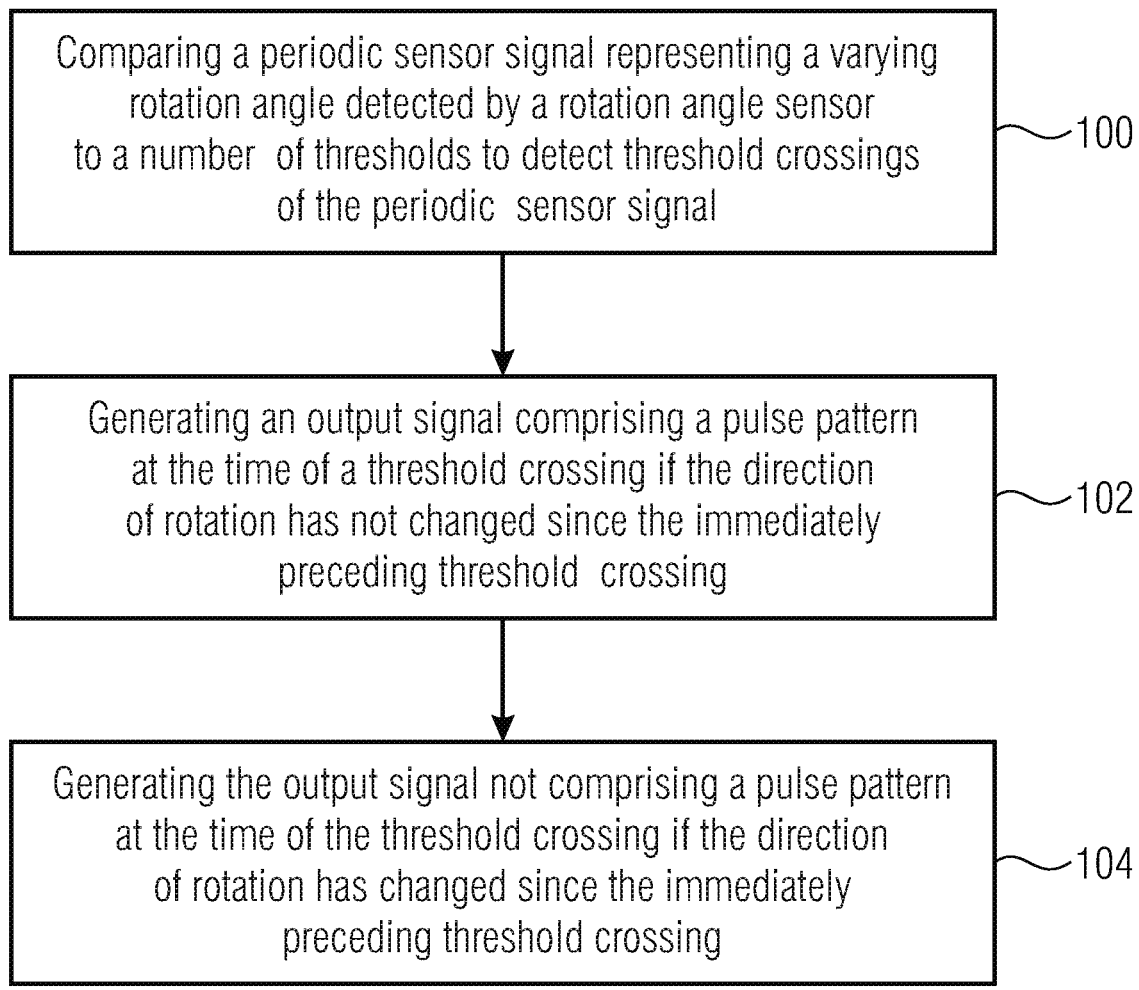
FIG. 13 shows a flow chart of an example of a method for generating an output signal.
Figure 14:
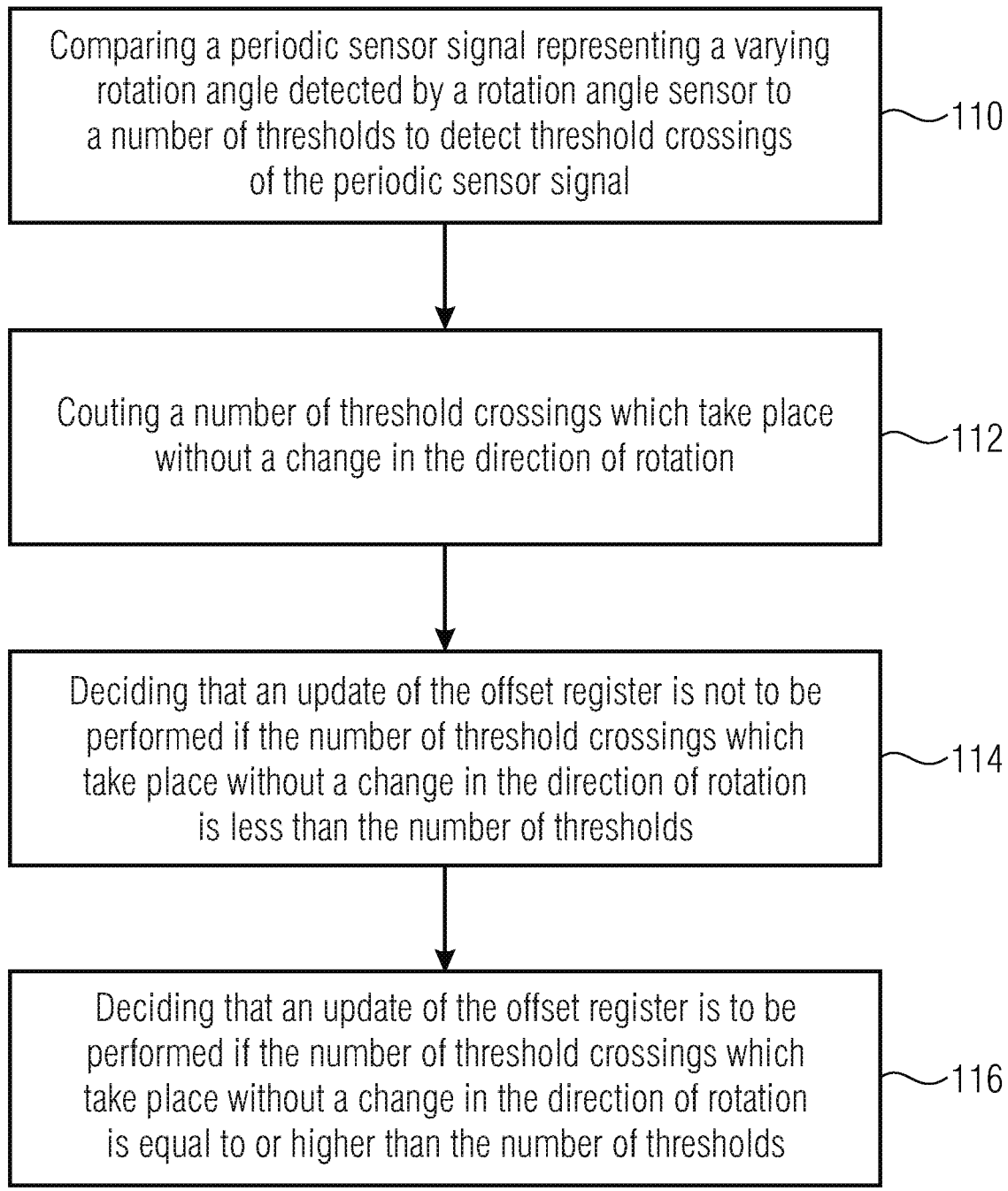
FIG. 14 shows a flowchart of an example of a method of determining whether an update of an offset register of a rotation angle sensor is to be performed.

Examples of the present disclosure provide a method of generating an output signal based on a periodic sensor signal representing a varying rotation angle detected by a rotation angle sensor as shown in FIG. 13. At 100, the periodic sensor signal is compared to a number of thresholds to detect threshold crossings of the periodic sensor signal. At 102, the output signal comprising a pulse pattern at the time of a threshold crossing is generated if the direction of rotation has not changed since an immediately preceding threshold crossing. At 104, the output signal not comprising a pulse pattern at the time of the threshold crossing is generated if the direction of rotation has changed since the immediately preceding threshold crossing.

Examples of the present disclosure provide a method of determining whether an update of an offset register of a rotation angle sensor is to be performed. At 110, a periodic sensor signal of the rotation angle sensor is compared to a number of thresholds to detect threshold crossings of the periodic sensor signal. At 112, a number of consecutive threshold crossings which take place without a change in the direction of rotation is counted. At 114, decision is made that that an update of the offset register is not to be performed if the number of consecutive threshold crossings which take place without a change in the direction of rotation is less than the number of thresholds. At 116, decision is made that an update of the offset register is to be performed if the number of consecutive threshold crossings which take place without a change in the direction of rotation is equal to or higher than the number of thresholds.

Examples of the present disclosure provide a wheel speed sensor configured to provide an output signal to an external device, such as an electronic control unit, ECU, of a vehicle. In operation, the sensor may be connected to the ECU, which calculates the speed, rotational direction and movement of the target wheel from the output signal of the sensor. The sensor may be configured to provide the output signal encoded in the so-called AK protocol. The external device may use the information from the sensor for various applications, such as ABS, EPS (electronic power steering), TSC (traction control system), autonomous parking, hill holder, electric engine control and other applications.

Examples of the disclosure provide an algorithm that is very robust against Vibrations and can be used in ABS applications at low speed. The present disclosure allows a control unit to have correct information on wheel movement, even when the wheel is vibrating. In examples of the disclosure, the algorithm comprises the following aspects. A calculation of the instantaneous phase of a magnetic signal is performed. Such calculation may already be implemented for high resolution applications and fast direction detection. An angle threshold crossing recognition is performed, which may already be implemented for high resolution applications and fast direction detection. Some digital logic is used to disable an offset update in case of wheel vibration (until a specific number of consecutive threshold crossings in the same direction is recognized) and re-enable it in case of real movement. Some digital logic is used to disable generation of a pulse pattern in an output signal in case a change of the direction of rotation has taken place since an immediately preceding threshold crossing.

Simulations of such an algorithm or method have been performed with different parameters:

Uncalibrated mode I Calibrated mode Starting phase: 22.5°, 67.5°, 112.5°, 157.5° Vibration amplitude: +−15°, +−30°, +−60°, +−120°, +−240° Part of the results of the simulations are shown in FIGS. 7 to 12.

Accordingly, apparatuses and methods of the present disclosure provide a vibration robustness feature for rotation angle sensors and, in particular, for wheel speed sensors. Thus, examples of the present disclosure may permit improved performance of wheel speed sensors for autonomous driving and parking applications.

Each of the apparatuses and processing units described herein may be implemented in hardware using discrete modules and/or data processing components that are not limited to any particular hardware and machine-readable instruction configuration. The apparatuses and processing units may be implemented using analogue and/or digital hardware components, such as application specific integrated circuits, field programmable gate arrays, CMOS circuits, digital signal processors, microprocessors and microcontrollers. The apparatuses and processing units may be implemented in any computing or data processing environment including hardware components, such as processors and memory devices, and machine-readable instructions. The machine-readable instructions may be stored in any appropriate memory and may be executed by the processor in order to achieve the functionalities and processes described herein. In some implementations, the functionalities are combined into a single component. In other implementations, the respective functionalities may be performed by a respective set of multiple components. The memory devices may store process instructions, machine-readable instructions, for providing the functionality and implementing the methods described herein. The memory devices may include tangible machine-readable storage media. Memory devices suitable for embodying these instructions and data include all forms of computer-readable memory, including, for example, semiconductor memory devices, such as EPROM, EEPROM, and flash memory devices, magnetic disks such as internal hard disks and removable hard disks, magneto-optical disks, and ROM/RAM devices. Accordingly, in examples, the apparatuses and processing units may be implemented in hardware or in a combination of hardware and machine-readable instructions to implement some or all of the functionalities described herein.

Examples of the present disclosure relate to a non-transitory machine-readable storage medium encoded with instructions executable by a processor, such as a processing resource of a computing device, to perform methods described herein.

Examples described herein can be realized in the form of hardware, machine-readable instructions or a combination of hardware and machine-readable instructions. Any such machine-readable instructions may be stored in the form of volatile or non-volatile storage such as, for example, a storage device like a ROM, whether erasable or rewritable or not, or in the form of memory, such as, for example, RAM, memory chips, device or integrated circuits or an optically or magnetically readable medium, such as, for example, a CD, DVD, magnetic disk or magnetic tape. The storage devices and storage media are examples of machine-readable storage, that are suitable for storing a program or programs that, when executed, implement examples described herein.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described examples are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the examples herein.

LIST OF REFERENCE SIGNS 10 apparatus for generating output signal
12 output signal
14 periodic sensor signal rotation angle sensor
16 rotation angle sensor
20 apparatus for determining whether to update #
22 offset register
30 rotation angle sensor device
32 processing unit
34 interface
40 magnetic encoder
42 rotating shaft
44 rotating shaft axis
T1-T6 thresholds
81' 82, 81', 82' sensor signals
P, P' periodic sensor signal
50 threshold crossing graph
60 output signal
TC threshold crossing
PP pulse pattern
70 direction signal
72 direction change signal
VIB vibration phase

What is claimed is:

1. An apparatus for generating an output signal based on a periodic sensor signal representing a varying rotation angle detected by a rotation angle sensor, the apparatus comprising:
    at least one processing circuit configured to compare the periodic sensor signal to a plurality of thresholds to detect threshold crossings of the periodic sensor signal; and
    a signal generator configured to generate the output signal comprising a pulse pattern at the time of a threshold crossing if a direction of rotation has not changed since an immediately preceding threshold crossing, and generate the output signal without the pulse pattern at the time of the threshold crossing if the direction of rotation has changed since the immediately preceding threshold crossing.

2. The apparatus of claim 1, wherein:
    the at least one processing circuit is configured to determine whether an update of an offset register of a rotation angle sensor is to be performed by:
    counting a number of consecutive threshold crossings which take place without a change in the direction of rotation;
    determining that the update of the offset register is not to be performed if the counted number of consecutive threshold crossings which take place without a change in the direction of rotation is less than a number threshold; and
    determining that the update of the offset register is to be performed if the counted number of consecutive threshold crossings which take place without a change in the direction of rotation is equal to or greater than the number threshold.

3. The apparatus of claim 1, wherein the pulse pattern comprises one or more pulses encoded with information permitting a receiver of the output signal to derive the direction of rotation and the threshold crossing of which triggered the generation of the pulse pattern in the output signal.

4. Apparatus for determining whether an update of an offset register of a rotation angle sensor is to be performed, the apparatus comprising:
    a processing circuit configured to compare a periodic sensor signal of the rotation angle sensor to a plurality of thresholds to detect threshold crossings of the periodic sensor signal;
    the processing circuit further configured to count a number of consecutive threshold crossings which take place without a change in the direction of rotation;
    the processing circuit further configured to determine that the update of the offset register is not to be performed if the number of consecutive threshold crossings which take place without a change in the direction of rotation is less than a number of thresholds of the plurality of thresholds that are configured for comparison to the periodic sensor signal within a full signal period of the periodic sensor signal; and
    the processing circuit further configured to determine that the update of the offset register is to be performed if the number of consecutive threshold crossings which take place without a change in the direction of rotation is equal to or greater than the number of thresholds of the plurality of thresholds that are configured for comparison to the periodic sensor signal within the full signal period of the periodic sensor signal.

5. The apparatus of claim 4, wherein the processing circuit is configured to restart counting the number of consecutive threshold crossings upon detecting a change in the direction of rotation.

6. The apparatus of claim 4, wherein the processing circuit is configured to determine whether the update of the offset register is to be performed in an uncalibrated mode at a start-up of a rotation angle sensor or in a calibrated mode of the rotation angle sensor.

7. The apparatus of claim 4, wherein the plurality of thresholds is uniformly distributed over a full range of values of the periodic sensor signal.

8. The apparatus of claim 4, wherein the plurality of thresholds is distributed over the full range of values of the periodic sensor signal and wherein the number of consecutive threshold crossings in the same direction, which is equal to or greater than the number of thresholds of the plurality of thresholds indicates a movement over a full period of the periodic sensor signal in one direction.

9. A rotation angle sensor device, comprising:
  a magnetic sensor configured to provide a periodic sensor signal
  an apparatus for generating an output signal based on the periodic sensor signal representing a varying rotation angle detected by the magnetic sensor, wherein the apparatus comprises:
    at least one processing circuit configured to compare the periodic sensor signal to a plurality of thresholds to detect threshold crossings of the periodic sensor signal; and
    a signal generator configured to generate the output signal comprising a pulse pattern at the time of a threshold crossing if a direction of rotation has not changed since an immediately preceding threshold crossing, and generate the output signal without the pulse pattern at the time of the threshold crossing if the direction of rotation has changed since the immediately preceding threshold crossing; and
  an interface configured to output the generated output signal to an external device.

10. A rotation angle sensor device, comprising:
  a processing circuit configured to compare a periodic sensor signal of the rotation angle sensor to a plurality of thresholds to detect threshold crossings of the periodic sensor signal,
  the processing circuit further configured to count a number of consecutive threshold crossings which take place without a change in the direction of rotation,
  the processing circuit further configured to determine that an update of the offset register is not to be performed if the number of consecutive threshold crossings which take place without a change in the direction of rotation is less than a number of thresholds of the plurality of thresholds that are configured for comparison to the periodic sensor signal within a full signal period of the periodic sensor signal, and
  the processing circuit further configured to determine that the update of the offset register is to be performed if the number of consecutive threshold crossings which take place without a change in the direction of rotation is equal to or higher greater than the number of thresholds of the plurality of thresholds that are configured for comparison to the periodic sensor signal within the full signal period of the periodic sensor signal and update the offset register; and
  a rotation angle sensor comprising the offset register, the rotation angle sensor configured to generate the periodic sensor signal based on a value stored in the offset register.

11. A rotation angle sensor device according to claim 10, wherein the rotation angle sensor comprises a first sensor element configured to output a first sinusoidal sensor signal in response to an applied magnetic field and a second magnetic sensor element configured to output a second sinusoidal sensor signal in response to the applied magnetic field, wherein the first and the second sinusoidal sensor signals have a phase difference of 90° with respect to each other, wherein the rotation angle sensor is configured to use one of a CORDIC algorithm, an inverse tangent function, or an atan 2 function to calculate the periodic sensor signal from the first and the second sinusoidal sensor signals.

12. A wheel speed sensor, comprising:
  rotation angle sensor device; and
  a magnetic encoder that comprises a pole wheel or a toothed wheel of a ferromagnetic material,
  wherein the rotation angle sensor device comprises:
    a processing circuit configured to compare a periodic sensor signal of the rotation angle sensor to a plurality of thresholds to detect threshold crossings of the periodic sensor signal,
    the processing circuit further configured to count a number of consecutive threshold crossings which take place without a change in the direction of rotation,
    the processing circuit further configured to determine that an update of the offset register is not to be performed if the number of consecutive threshold crossings which take place without a change in the direction of rotation is less than a number threshold, and
    the processing circuit further configured to determine that the update of the offset register is to be performed if the number of consecutive threshold crossings which take place without a change in the direction of rotation is equal to or higher greater than the number threshold and update the offset register; and
  a rotation angle sensor comprising the offset register, the rotation angle sensor configured to generate the periodic sensor signal based on a value stored in the offset register,
  wherein the rotation angle sensor comprises a first sensor element configured to output a first sinusoidal sensor signal in response to an applied magnetic field and a second magnetic sensor element configured to output a second sinusoidal sensor signal in response to the applied magnetic field, wherein the first and the second sinusoidal sensor signals have a phase difference of 90° with respect to each other, wherein the rotation angle sensor is configured to use one of a CORDIC algorithm, an inverse tangent function, or an atan 2 function to calculate the periodic sensor signal from the first and the second sinusoidal sensor signals.

13. A method of generating an output signal based on a periodic sensor signal representing a varying rotation angle detected by a rotation angle sensor, the method comprising:
  comparing the periodic sensor signal to a plurality of thresholds to detect threshold crossings of the periodic sensor signal;
  generating the output signal comprising a pulse pattern at the time of a threshold crossing if the direction of rotation has not changed since an immediately preceding threshold crossing; and generating the output signal without the pulse pattern at the time of the threshold crossing if the direction of rotation has changed since the immediately preceding threshold crossing.

14. The method of claim 13, further comprising:
determining whether an update of an offset register of a rotation angle sensor is to be performed by:
   counting a number of threshold crossings which take place without a change in the direction of rotation;
   determining that an update of the offset register is to not be performed if the counted number of consecutive threshold crossings which take place without a change in the direction of rotation is less than a number threshold; and
   determining that an update of the offset register is to be performed if the counted number of consecutive threshold crossings which take place without a change in the direction of rotation is equal to or greater than the number threshold.

15. The method of claim 13, wherein the pulse pattern comprises one or more pulses encoded with information permitting a receiver of the output signal to derive the direction of rotation and the threshold crossing of which triggered in the generation of the pulse pattern in the output signal.

16. A method of determining whether an update of an offset register of a rotation angle sensor is to be performed, the method comprising:
   comparing a periodic sensor signal of the rotation angle sensor to a plurality of thresholds to detect threshold crossings of the periodic sensor signal;
   counting a number of consecutive threshold crossings which take place without a change in the direction of rotation;
   determining that the update of the offset register is not to be performed if the counted number of consecutive threshold crossings which take place without a change in the direction of rotation is less than a number threshold; and
   determining that the update of the offset register is to be performed if the counted number of consecutive threshold crossings which take place without a change in the direction of rotation is equal to or greater than the number threshold.

17. The method of claim 16, wherein counting the number of consecutive threshold crossings is restarted upon detecting a change in the direction of rotation.

18. The method of claim 16, wherein the plurality of thresholds is uniformly distributed over a full range of values of the periodic sensor signal.

19. The method of claim 16, wherein the plurality of thresholds is distributed over the full range of values of the periodic sensor signal and wherein a number of consecutive threshold crossings in the same direction, which is equal to or greater than the number threshold indicates a movement over a full period of the periodic sensor signal in one direction.

20. A non-transitory machine-readable medium storing instructions that, when executed by a processor, cause the processor to perform a method according to claim 13.

21. The apparatus of claim 1, wherein:
   the offset register stores a correction value and the at least one processing circuit is configured to generate the periodic sensor signal based on the correction value, and
   the at least one processing circuit is configured to update the correction value stored in the offset register if the at least one processing circuit determines that the counted number of consecutive threshold crossings which take place without a change in the direction of rotation is equal to or greater than the number threshold.

22. The apparatus of claim 1, wherein the number threshold is equal to a number of thresholds of the plurality of thresholds that are configured for comparison to the periodic sensor signal within a full signal period of the periodic sensor signal.

23. The apparatus of claim 4, wherein:
   the offset register stores a correction value and the at least one processing circuit is configured to generate the periodic sensor signal based on the correction value, and
   the at least one processing circuit is configured to update the correction value stored in the offset register if the at least one processing circuit determines that the counted number of consecutive threshold crossings which take place without a change in the direction of rotation is equal to or greater than the number of thresholds of the plurality of thresholds that are configured for comparison to the periodic sensor signal within the full signal period of the periodic sensor signal.

24. The method of claim 16, wherein the number threshold is equal to a number of thresholds of the plurality of thresholds that are configured for comparison to the periodic sensor signal within a full signal period of the periodic sensor signal.

25. The method of claim 16, wherein the offset register stores a correction value, the method further comprising:
   updating the correction value stored in the offset register upon determining that the counted number of consecutive threshold crossings which take place without a change in the direction of rotation is equal to or greater than the number threshold; and
   generating the periodic sensor signal based on the correction value stored in the offset register.

* * * * *